Patented June 4, 1946

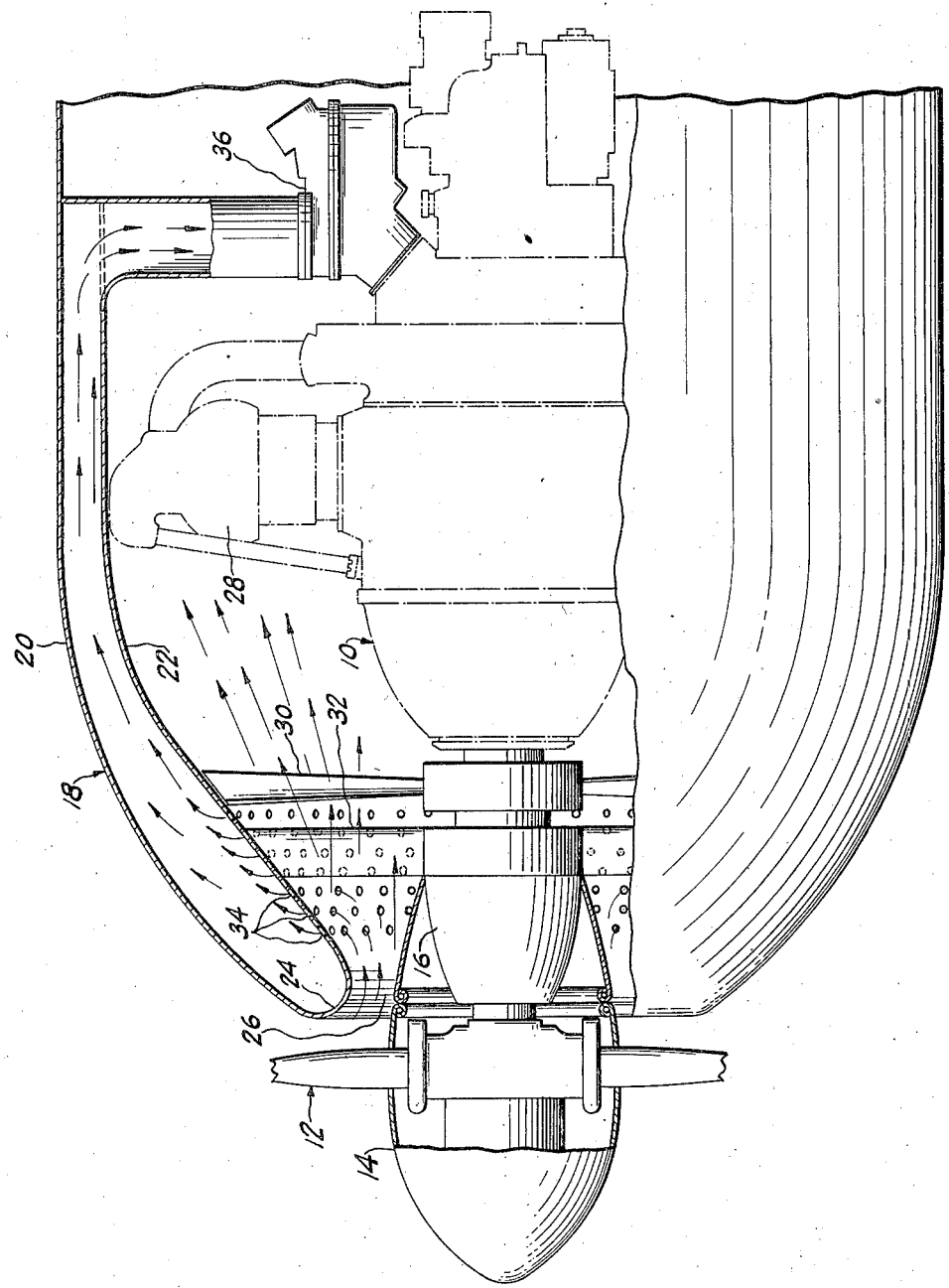

2,401,584

UNITED STATES PATENT OFFICE 2,401,584

AIR FLOW INDUCING DEVICE

Thomas B. Rhines, Glastonbury, Conn., assignor to United Aircraft Corporation, East Hartford, Conn., a corporation of Delaware Application December 31, 1938, Serial No. 248,797

8 Claims. (Cl. 123—171)

This invention relates to improvements in air flow inducing devices and has particular reference to an improved cooling system for an air-cooled internal combustion engine.

An object of the invention resides in the provision in an air flow device of the character specified of means for increasing the air flow and improving the distribution of air flowing through the device by removing the boundary layer of air from at least a portion of the wall of the air flow passage.

A further object resides in the provision in an air flow inducing arrangement including an expansion chamber of means for reducing energy losses due to the expansion of the air in said chamber.

A still further object resides in the provision of an improved cowling and cooling arrangement for an engine or an engine heat radiating device arranged to materially decrease the aerodynamic drag of the engine or engine heat radiating device and at the same time provide an adequate flow of cooling air past all of the heat radiating portions of the engine or radiating device.

An additional object resides in the provision in an enclosure through which an air stream is projected of means for reducing the loss of energy in said air stream due to friction with the walls of said enclosure.

Other objects and advantages will be more particularly pointed out hereinafter or will become apparent as the description proceeds.

In the accompanying drawing in which like reference numerals are used to designate similar parts throughout there is illustrated, by way of example, a suitable mechanical embodiment of the invention. The drawing, however, is for the purpose of illustration only and is not to be taken as in any way limiting or restricting the scope of the invention as set forth in the accompanying claims.

In the drawing, the single figure is a side elevational view of a cowl enclosed aircraft engine, a portion of the cowl being broken away and shown in section to illustrate the application of the invention.

Referring to the drawing in detail, the numeral 10 generally indicates an air-cooled radial engine of the type conventionally employed for the propulsion of aircraft. It is to be understood, however, that the invention is equally applicable to any cowl enclosed structure whether it be the engine itself or a device such as a radiator for dissipating engine heat and that the invention in its broader aspect is not necessarily limited to cooling systems alone but may be used in any case in which it is desirable to reduce the wall friction induced energy loss of an air stream flowing through an encircling channel, particularly where such a channel is not of a uniform diameter throughout its length.

In the arrangement illustrated for the purpose of disclosing the invention, the engine 10 drives an aeronautical propeller, generally indicated at 12, the hub portion of which is surrounded by a spinner 14 having a streamlined external contour. In the arrangement illustrated, the propeller is disposed at a considerable distance from the front end of the engine and an intermediate drive 16 is disposed between the engine and the propeller. The engine and a portion of the spinner 14 is surrounded by a streamlined cowl generally indicated at 18 having an outer wall 20 and an inner wall 22 providing a closed annular space entirely surrounding the engine. The inner and outer walls 20 and 22 are joined at the front end by a smooth curve as indicated at 24 to provide a smoothly curved low resistant air intake opening for the front end of the cowl. In order to reduce the aerodynamic resistance of the cowled engine the forward portion of the cowl is necked in very closely about the portion of the spinner 14 immediately behind the propeller 12 thus providing a relatively narrow annular air entrance opening as indicated at 26. Immediately behind the air entrance opening 26 the inner wall 22 of the cowl flares outwardly until it clears the outer ends of the engine cylinders 28. This arrangement necessitates a very rapid expansion of the cooling air stream between the air entrance opening 26 and the annular row of engine cylinders 28. Because of the drastically restricted air entrance opening it has been found desirable to provide an engine driven fan 30 for assisting the flow of cooling air past the engine. The hub of this fan may be mounted surrounding the engine shaft between the front end of the engine and the rear of the intermediate drive 16 and the fan may be driven either directly from the engine shaft or through a suitable gear drive either separately contained in the fan hub or incorporated with the intermediate drive. This fan may be of the propeller type and may have two or more blades extending from the hub outwardly to a position adjacent to the surface of the inner cowl wall 22. A plurality of guide vanes 32 may be located between the fan and the air entrance opening 26 to direct the air properly to the fan to thereby increase the fan efficiency and these guide vanes may constitute a support for the forward end of the cowl.

With the arrangement illustrated and hereinabove described there is a considerable tendency for the air to fail to expand rapidly in its passage from the air entrance opening to the fan. This may be due to air pressure inside the cowl and to various other causes. Such a condition means that only a relatively short section of the fan blades are utilized in propelling the air stream and that the air flow past the engine cylinders differs greatly in velocity across its transverse section thus causing a relatively inefficient fan operation and in some cases an uneven cooling of the various parts of the engine cylinders or a heat dissipating radiator disposed in the air stream.

The above mentioned disadvantages may be overcome and the fan may be rendered highly efficient and the flow of cooling air evenly distributed over the heat radiating surface of the element to be cooled by providing in the inner cowl wall immediately to the rear of the air entrance opening 26 a relatively large number of apertures or perforations, as indicated at 34, and connecting the annular space between the inner and outer cowl walls with some inductive device such as the engine carburetor 36. While the air intake of the engine carburetor is sufficient to produce the necessary inductive effect in the arrangement illustrated, the invention is in no way limited to this particular arrangement and any other means such as an induction fan or pump or an inductive air flow may be provided to draw a portion of the air entering the opening 26 through the aperture 34 and into the space between the inner and outer cowl walls or in any case to draw a portion of the air through the apertures in the air stream encircling enclosure in case the air flow device contemplated is not a double walled cowl as illustrated. A very slight suction on the aperture 34 serves to continuously remove the thin lever of air which tends to cling to the inner surface of the inner wall 22 and produce friction with the air stream flowing through this encircling wall. The removal of this boundary layer eliminates eddy current and stagnation areas around the outside of the air stream thereby permitting the air stream to expand freely and to assume the form of a stratified flow through the expansion chamber immediately to the rear of the air entrance opening. A part of this effect may be ascribed to the reduction in energy loss in the portion of the air stream adjacent the confining surface. By maintaining a smooth flow and uniform expansion of the air stream in the expansion chamber the entire length of the fan blades are used and an air stream of uniform velocity cross section is directed to the cylinders 28 or other heat radiating device.

While a particular mechanical embodiment has been illustrated and hereinabove described for the purpose of disclosing the invention, it is to be understood that the invention is in no way limited to the particular embodiment so illustrated and described but that such changes in the size, shape and arrangement of the various components may be resorted to as come within the scope of the sub-joined claims.

Having now described the invention so that others skilled in the art may clearly understand the same, what it is desired to secure by Letters Patent is as follows:

1. In an engine cooling system, an enclosure having a restricted air entrance opening, an air exit opening and an expansion chamber between said entrance opening and said exit opening, a perforate wall for the major portion of said expansion chamber having relatively small perforations uniformly distributed thereover, and means for continuously drawing the outer layer of air from said expansion chamber through said perforations.

2. In an engine cooling system, an enclosure having a restricted air entrance opening, an air exit opening and an expansion chamber between said entrance opening and said exit opening, a wall for said expansion chamber having relatively small perforations distributed over a substantial portion of the area thereof, and means operated by said engine for continuously withdrawing the layer of air next to said wall from said expansion chamber through said perforations during engine operation.

3. In an engine cooling system, an enclosure having a restricted air entrance opening, an air exit opening and an expansion chamber between said entrance opening and said exit opening, a wall for said expansion chamber having a large number of relatively small perforations uniformly distributed entirely around the smaller end of said chamber, and an air intake for said engine operatively connected with the side of said perforate wall opposite said chamber for continuously withdrawing the outer layer of air from said expansion chamber through said perforations during engine operation.

4. In an engine cooling system, a double walled cowl providing an annular space about the engine heat radiating means, said cowl having a restricted air entrance opening, an exit opening and an expansion chamber between said entrance opening and said exit opening provided with a surrounding wall having a large number of relatively small perforations distributed over the area thereof, and means operated by said engine operatively associated with said annular space for continuously drawing air from said expansion chamber through said perforations during engine operation.

5. In an engine cooling system, a double walled cowl providing a closed annular space adjacent to said engine, said cowl having a restricted air entrance opening, an air exit opening, and an air expansion chamber between said entrance opening and said exit opening, the inner wall of said double walled cowl having a large number of relatively small perforations distributed over the area thereof surrounding said expansion chamber, a carburetor for said engine, and an air intake for said carburetor connected with said closed annular space for continuously withdrawing the outer layer of air from said expansion chamber through said perforations during operation of said engine to decrease the frictional resistance to airflow through said expansion chamber.

6. In combination with an engine having an engine air intake, an air flow channel having a portion diverging in the direction of air flow, a wall for said diverging portion having a large number of relatively small perforations distributed over the area of said wall surrounding said divergent portion, and duct means communicating with said perforations in said wall at the side of said wall outside of said channel and with said engine air intake for continuously withdrawing air through said perforations from the outer layer of air in the divergent portion of said channel.

7. Means for reducing the friction loss at a cowl inlet and increasing the air flow under a cowl comprising a smooth cowl inner wall having a large number of relatively small perforations distributed over the area thereof, and means for reducing the pressure on the outside of said wall to continually withdraw the boundary layer adjacent said inner wall through said perforations.

8. In an engine cooling system in combination, an engine cowl having an air entrance, an air exit and an expansion chamber therebetween, said cowl having a perforated wall in said expansion chamber serving as a guide for cooling air for said engine, and means for reducing the friction loss of air passing over said wall and increasing the air flow through said cowl comprising means for removing the boundary layer adjacent said wall through the perforations in said wall.

THOMAS B. RHINES.